United States Patent [19]

Fitzgerald

[11] Patent Number: 5,259,559
[45] Date of Patent: Nov. 9, 1993

[54] ELECTRICAL GENERATION AND DISTRIBUTION SYSTEM FOR A PLURALITY OF WATER WELLS

[76] Inventor: James L. Fitzgerald, Box 89, Balmorhea, Tex. 79718

[21] Appl. No.: 820,163

[22] Filed: Jan. 13, 1992

[51] Int. Cl.$^5$ .............................................. B05B 3/00
[52] U.S. Cl. .................................... 239/728; 307/17
[58] Field of Search .............. 239/728, 729, 730, 731; 307/17, 83

[56] References Cited

U.S. PATENT DOCUMENTS

| | | | |
|---|---|---|---|
| 342,552 | 5/1886 | Westinghouse, Jr. | 307/17 |
| 404,567 | 6/1889 | Shallenberger . | |
| 470,865 | 3/1892 | DePrez et al. | 307/17 |
| 503,621 | 8/1893 | Shallenberger . | |
| 503,622 | 8/1893 | Stanley, Jr. . | |
| 519,076 | 5/1894 | Thomson . | |
| 596,041 | 12/1897 | Hunter | 307/17 |
| 625,816 | 5/1899 | Thomson . | |
| 740,189 | 9/1903 | Shallenberger . | |
| 740,190 | 9/1903 | Shallenberger . | |
| 1,270,666 | 1/1942 | Arutunoff | 103/78 |
| 1,885,140 | 11/1932 | Rehse . | |
| 2,898,542 | 8/1959 | Wasko et al. | 322/90 |
| 2,961,966 | 11/1960 | Zillman et al. | 301/45 |
| 3,457,428 | 7/1969 | Perry | 307/17 |
| 3,488,563 | 1/1970 | Caruthers et al. | 317/157.6 |
| 3,691,393 | 9/1972 | Papachristou | 290/30 |
| 4,087,698 | 5/1978 | Myers | 307/84 |
| 4,142,548 | 3/1979 | Orcutt | 239/728 |
| 4,277,026 | 7/1981 | Garvey | 239/728 |
| 4,303,833 | 12/1981 | Eckel et al. . | |
| 4,358,055 | 11/1982 | Reinke | 239/733 |
| 4,674,681 | 6/1987 | Meis et al. | 239/729 |
| 4,831,277 | 5/1989 | Christopeher . | |
| 4,914,373 | 4/1990 | Rivkine . | |

Primary Examiner—Andres Kashnikow
Assistant Examiner—Christopher G. Trainer
Attorney, Agent, or Firm—Marcus L. Bates

[57] ABSTRACT

An irrigation system for watering a group of large fields on which crops are grown. A water well is arranged on each field and an electric motor driven pump produces each water well. A motor/generator supplies current to an electric motor of each water well by a step-up transformer having a low voltage primary and a high voltage secondary winding to receive current from the electrical generator. The primary of a several step down transformers are connected in parallel to supply current to an irrigation pump motor. Each electric motor has a contact connected to current carrying electrical conductors that are buried below the surface of the ground. Well water is conveyed to a pivot type traveling irrigation system having a rotating coupling by which water is conveyed from said pump into the sprinkler system. All of the electrical conductors interconnecting the transformers and pump motors are placed underground.

4 Claims, 2 Drawing Sheets

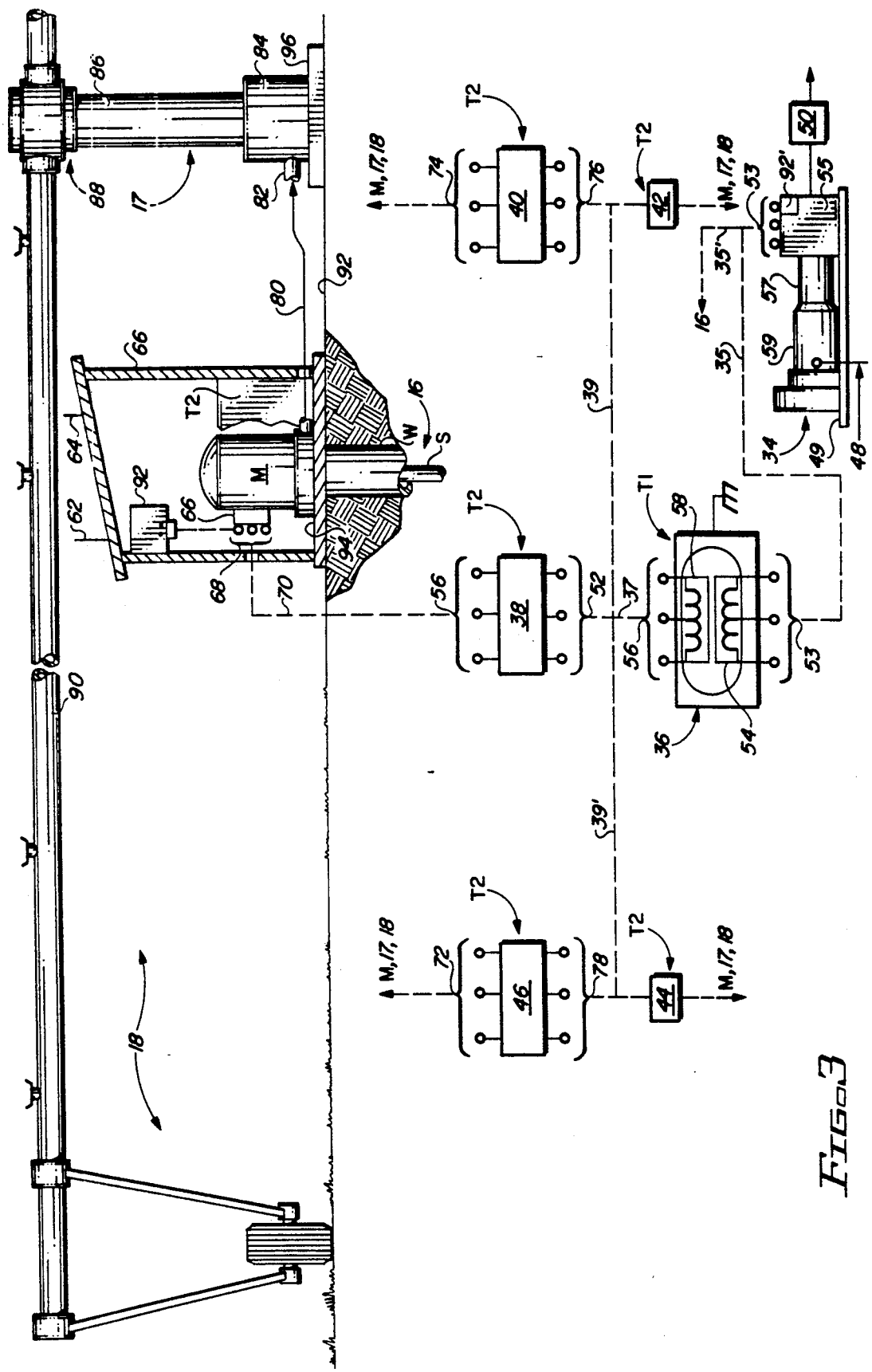

ELECTRICAL GENERATION AND DISTRIBUTION SYSTEM FOR A PLURALITY OF WATER WELLS

BACKGROUND OF THE INVENTION

There are many geographical areas in the United States that have changed from desolate range land into thriving agricultural areas which are presently reverting back to ranch land because of an economic situation brought about by the relatively low income from the farm commodity products and the relatively high cost for electricity.

For example, out in Pecos, Tex. there are hundreds of square miles of fertile land that at one time represented some of the best irrigated farm land in the nation. Most everyone has eaten a world famous Pecos, Tex. cantaloupe, but it is unlikely that they will get to eat another because most of this land is no longer farmed due to the rising cost of electricity, coupled with the lowering of the water table. Many of these of farms depend upon electric motors for driving a downhole water pump. Some of the electric pump motors are of the submersible type while other of the electric pump motors are of the line shaft type.

The water table in the Pecos area has been lowered from a depth of 100 feet down to more than 400 feet over the past fifty years, thus requiring significantly more power to lift the water to the surface of the earth where it can be used for irrigating the growing crops. Furthermore, in recent years, fuel costs have escalated more than ten-fold, and this, together with the low commodity prices has left the Pecos farmer with a marginally adequate farming income.

There are a few irrigated farms left in the Pecos area trying to eke out a living that depend on electricity for lifting water for irrigation purposes. The monthly electrical bill associated with farming is equivalent to an acceptable monthly income and therefore if the marginal Pecos farmer could reduce his electrical bill by fifty percent, and sometime up to eighty percent, he would be able to happily cultivate his irrigated farm and show an acceptable profit most of the time. This is technically possible, especially in those areas where the electrical consuming public is paying for the ghastly mistakes associated with the unsuccessful atomic energy generating plants.

An agricultural generation and distribution system for producing well water with electrical energy is the subject of the present invention.

SUMMARY OF THE INVENTION

This invention comprehends an electrical generation and distribution system for a plurality of water wells, wherein a plurality of adjacent agricultural fields are each provided with a water well having a downhole pump therein for producing water for the crops growing on the field. Each of the downhole pumps has a 3 phase motor that is electrically powered by means of a step-down transformer. An underground electrical conductor connects each of the plurality of step-down transformers to a common high voltage step-up transformer. The step-down transformers are connected in parallel to the single high voltage step-up transformer. The high voltage step-up transformer is connected to receive current from a motor/generator having a three phase low voltage output.

The step-up and step-down transformers are connected by buried cables that lay below the plowing depth required for suitably cultivating the land.

In a preferred embodiment of the invention, the motor of the motor/generator is fueled with natural gas. The motor/generator outputs to a step-up transformer by means of underground electrical conductors. The generator of the motor/generator also outputs directly to one of the plurality of electrical motors for one of the downhole pumps. The generator also outputs single phase 110 and 220 volt current to a barn or farm house, and for operating a traveling irrigation system.

In another embodiment of the invention, the produced water is distributed by a pivotal type traveling irrigation sprinkler system. The pump motor and transformers are of low profile that permits the traveling irrigation sprinkling system to pass thereabove.

A controller interconnects the generator with the step-up transformer. Each of the step-down transformers are connected to a pump motor by a controller which can be selectively, remotely energized for a predetermined time interval, thereby determining the maximum load placed on the motor/generator at a given time.

A primary object of the present invention is the provision of an agricultural generation and distribution system for generating electrical energy and producing well water with the generated electrical energy.

Another object of the invention is to provide an improved agricultural generation and distribution system for generating electrical current, distributing the generated electrical current, producing well water with the electrical energy, and remotely controlling the electrical energy to reduce the labor requirements for the farmer.

A further object of this invention is to disclose and provide a new combination of an agricultural generation and distribution system for producing well water with electrical energy that can be used to replace public utility electricity and thereby allow the farmer to be more independent of costly utility type services.

A still further object of this invention is the provision of a method that provides a new agricultural generation and distribution system for producing well water with electrical energy by the provision of a plurality of step-down transformers connected by underground electrical conductors to a step-up transformer which in turn is connected to a motor/generator in a manner to reduce the cost of producing irrigation water and at the same time increase the safety of the farm personnel.

These and various other objects and advantages of the invention will become readily apparent to those skilled in the art upon reading the following detailed description and claims and by referring to the accompanying drawings.

The above objects are attained in accordance with the present invention by the provision of a method for the use of a combination of elements which are fabricated in a manner substantially as described herein.

DETAILED DESCRIPTION OF THE PREFERRED EMBODIMENTS

Figure 1:
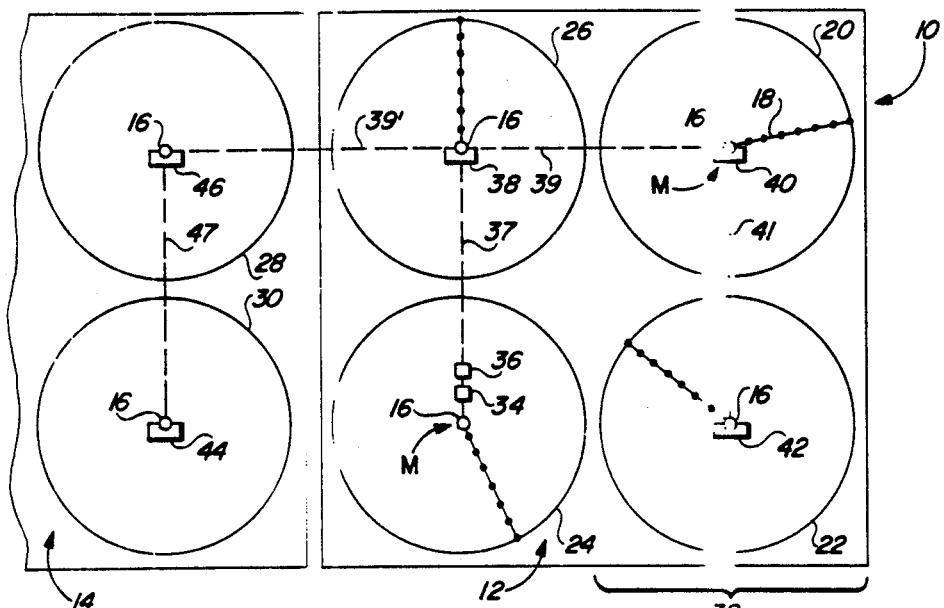
FIG. 1 is a part diagrammatical, part schematical, plan view of an agricultural generator and distribution system for generating power and water.

FIG. 1 illustrates an electrical generation and distribution system 10 by which crop land is irrigated. The system includes substantially large areas of farmland or fields 12 and 14. The adjacent fields 12 and 14 preferably are sections; that is, one mile by one mile which equals six hundred forty acres, all of which adjoin to one another. Each irrigation well 16 is connected to supply an irrigation system pivot 17 with an abundant supply of water for the rotating sprinkler system generally indicated by the numeral 18.

Each section of land preferably is divided into circular quarter section fields 20, 22, 24, 26, 28 and 30. Each quarter section field is approximately one-half mile in length and breadth and therefore requires a sprinkler apparatus 18 that is approximately one-fourth mile in length so that it adequately waters the one-half mile diameter field 20. Numeral 32 indicates the one-half mile.

Figure 2:
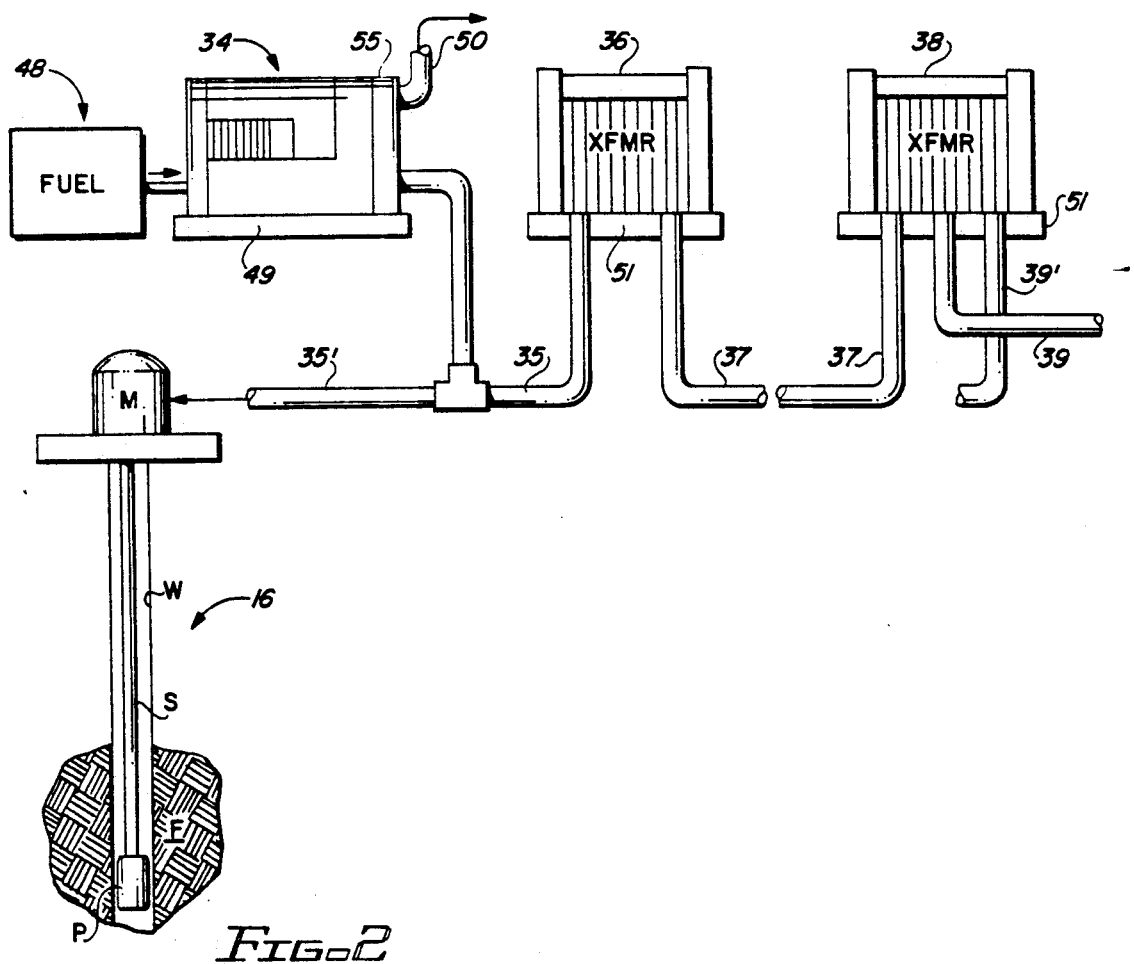
FIG. 2 is a side elevational, detail of part of the apparatus illustrated in FIG. 1; and, FIG. 3 is a part diagrammatical, part schematical, representation of the system of FIG. 1.

As best seen in FIG. 2, together with other figures of the drawings, a stationary motor/generator assembly 34 outputs 380 volts three phase current to a step-up hi-voltage transformer 36. The step-up transformer outputs 4800 volts to a step-down transformer 38. The step-down transformer converts the 4800 volts to 480 volts three phase current which is connected to the three phase electrical motor M associated with each of the water wells 16 illustrated in FIG. 1.

The motor M of the irrigation wells 16 is a selected three phase 480 volt AC, 20-250 horsepower motor. The motor M can be directly connected to a downhole pump P by means of rotating shaft S, or alternatively, a submersible motor/pump combination can be used to lift the water from the aquifer F to pivot 17 of sprinkler system 18.

A motor/generator 34 which advantageously can be used in the present distribution system preferably is a gas fueled internal combustion set, similar to the electric set, such as described in bulletin #382732 by Cummings Engine Company, Inc., Columbus, Ind. 47202 (revised April 1986). The details of the appropriate switches and controllers are also disclosed in the same bulletin.

The step-up transformer 36, along with the switches and controllers, preferably are similar to those disclosed in General Electric bulletin November 1984, entitled "Three-phase Pad-Mounted Transformers, The General Electric Co, Distribution Transformer, Business Department, Hickory, N.C. 28603.

The step-down transformer 38 preferably is similar to the above step-up transformers.

The output of the motor/generator 34 is connected by any well known controller to the before mentioned transformer 36. The output from the motor/generator 34 also is connected by a controller to an electrical conductor 35' to a first motor M located in field 24. The first motor M and the before mentioned transformer 36 are in parallel with one another. Electrical conductor 35, along with the other current carrying electrical conductors, is buried well below plowing depth and interconnects the motor/generator 34 with the step-up transformer 36. Electrical conductor 37 likewise is buried and interconnects the step-up high voltage transformer 36 and the step-down low voltage transformer 38 together. The output from transformer 38 provides 480 volt three phase current for the electric motor M connected to the deep well associated with field 26.

Electrical conductors 39, 39' connect to other low voltage transformers 40, 42, 44 and 46 by means of buried electrical conductors 41 and 47. The method of burying the electrical conductors, the electrical conductor size, and the physical construction of the electrical conductor are well known features that may be considered within the design capabilities of those skilled in the art.

A fuel supply 48, preferably natural gas, provides combustion gases for the motor/generator 34. Where natural gas is unavailable, diesel fuel or another fuel source advantageously can be used in conjunction with this invention.

Numeral 50 indicates a low voltage, single phase, 220/110 volt power supply for a farm house, barn, small motors, and the like. Pads 49 and 51 suitably support the motor/generator 34 and the transformers 36, 38, 40, 42, 44 and 46.

In FIG. 3, numeral 53' indicates the supply contacts leading from terminal 53 of switch box 55. The switch box 55 is a controller by which the generator 57 is electrically connected to contacts 53, 53' of the low voltage winding 54 of step-up hi-voltage transformer 36. Output high voltage contacts 56 are connected to the high voltage secondary winding 58 of transformer 36.

An enclosure 60 houses each of the water wells 16. The motor M for wells 16 is provided with an electrical controller by which the motor M is connected to the input terminal 68, and is protected from damage that may result from overload, overheating, pump off conditions, and other malfunctions. Electrical conductor 70 interconnects terminals 68 with terminals 56 of step-down transformer 38.

The output contacts 72 of transformer 46 are connected to the controller associated with the appropriate wellhead. Each of the controllers 66 can further be connected to supply current to the electrical requirements of the sprinkler system, including the motor driven pivot, for example. Often the rotation of the pivot is by means of water motors that drive the individual wheels of the sprinkler system.

Numeral 74 indicates commercially available low voltage output contacts of step-down transformer 40. Contacts 76 connect the primary of the step-down transformer 40 to the buried electrical conductor 39. Numeral 78 similarly indicates contacts for connecting step-down transformer 46 with buried electrical conductor 39'.

Water from the deep well W is conveyed by flow conduit 80 into inlet 82 at base 84 of pivot 17 of irrigation system 18. Standard 86 elevates the fluid coupling 88 to a height necessary to enable the traveling water carrying boom 90 to clear enclosure 60. The individual transformers have a low profile which likewise clears the water conveying boom 90.

The individual transformers include means by which the contacts at 52, 76, 78 can be disconnected from the step-up transformer 36. The motor controller 66 has means associated therewith by which contacts 68 are disconnected from transformer 38, for example.

In operation, a fuel supply is provided at 48 and the motor 59 energized to cause generator 57 to generate a three phase 480 volt AC current at switch control box 55. The power output of the motor/generator depends upon the power requirements of the power consuming apparatus associated with the invention, and the duty cycle of the power consuming apparatus.

After the motor/generator assembly 34 has been brought up to speed and is suitably operating, controller 55 is actuated to energize the step-up high voltage transformer 36 to thereby provide high voltage current at 56. This energizes the electrical conductor 35 that interconnects buried electrical conductors 35, 35' leading to the transformer 36, 38, 40, 42, 44 and 46.

Electrical Conductor 35' is in parallel with electrical conductor 36 and provides power directly to 34 the circuit breakers of the motor associated with field 24. The apparatus at 34 is identical to the apparatus housed within enclosure 60, that is electrical conductor 35' outputs directly to the controller of a motor M associated with the irrigation equipment of the field seen indicated by the numeral 24.

Contacts 56 interconnect high voltage secondary 58 of transformer 36 to the buried electrical conductor 37. The electrical conductor 37 is connected to contacts 56 of the step-down transformer 38. The secondary of the step-down transformer 38 is provided with contacts 56 connected to conduct current from the buried electrical conductor 70 that is connected to controller 66 of Motor M by means of the current interrupter contacts at controller 68. Controller 92, which can take on a number of different forms, controls the action of controller 66.

The step-down transformers 40, 42, 44, and 46 are similarly connected to a deep well pump similar to the apparatus housed within enclosure 60. Provision is made for suitably cooling the transformers. The generator output preferably is 480 volts, 60 hertz, and is connected either delta or y as may be desired.

The substation transformer input is 480 volts three phase current and the output can be 2400-2160 three phase or 7200/12,470 50 or 60 Hertz, three phase Y connected.

The distribution transformer is a three phase 60 hertz having an input primary 2400/2160 volt AC 3 0 Y or 7200/12,470 3 0 Y with a secondary side of 480 volts AC 3 0 Y connection. The transformers each have primary tab changes for selecting a two and one-half percent value above and below the nominal voltage.

The electric motor M is 25-300 horsepower and wired three phase 480 volts 60 hertz and is Y connected.

Capacitors are added as required to maintain the proper phase relationship where needed to increase the power factor of the current received from the motor/generator.

Secondary capacitors may be added for each of the motors where it is desired to improve the power factor.

All transformers and switch gear have a frame ground and all common grounds are catwelded to the outer casings of the water well to insure good grounded system for Y hookups of the transformers.

The internal combustion engine of the motor/generator can be powered by natural gas, diesel, LPG or gasoline. Generally, natural gas will be the cheapest fuel available because of the close proximity of gas wells in the Pecos, Tex. area.

The prime mover can be fueled with LPG, diesel, natural gas, and liquid petroleum products. The apparatus of the invention can supply three phase 220 AC current to the drive motor on pivot sprinkler devices. The apparatus is lightening proof due to its low profile and underground design.

I claim:

1. An electrical generator and distribution system including a plurality of three phase AC motors, an irrigation water pump located downhole in a wellbore; each said motor drives a respective irrigation water pump;

means by which each water pump produces water from the respective wellbore to irrigate one of a plurality of adjoining fields, there being a wellbore for each said field and one pump for each wellbore;

a hydrocarbon consuming prime mover for powering said electrical generator and generating a voltage by which three phase AC current is made available to the system;

means mounting a three phase step-up transformer in close proximity respective to said generator for increasing the output voltage of said generator from a relative low voltage to a relative high voltage three phase AC current;

means mounting a three phase step-down transformer in close proximity of said motors for supplying the motor of each said water well with a suitable relatively low voltage three phase current; an underground three phase high voltage electrical conductor connected from said step-up transformer to each of said step-down transformers, each said step-down transformer being connected in parallel respective to one another;

a motor controller for each said pump motor for connecting the motor of each said water well with a suitable supply of current from the secondary of said step-down transformer;

each said downhole pump is connected to supply water to a pivot type irrigation sprinkler system having a rotating coupling by which water is conveyed from a pump into the sprinkler system.

2. In an irrigation system for watering a plurality of adjoining fields on which crops are grown, a water well for each of said fields, an electric motor driven pump for producing each water well; the improvement comprising:

a prime mover, an electrical generator connected to be powered by said prime mover for supplying current to the electric motor driven pump of each water well;

a step-up transformer having a low voltage primary winding and a high voltage secondary winding, controller means connecting the primary winding to said electrical generator;

a plurality of step-down transformers, each having a high voltage primary for connection to said secondary of said step-up transformer; said primary of each of said plurality of step-down transforms being connected in parallel; said secondary of each of said plurality of step-down transformers being connected to an irrigation pump motor by a motor controller and thereby energizing one said electric motor;

electrical conductors are buried below the surface of the ground; means by which the electrical conductors interconnect the secondary of the step-up transformer and the primary of the step-down transformer;

said irrigation system includes a pivot type traveling sprinkler apparatus having a rotating coupling by which water is conveyed from said pump into the sprinkler apparatus; the buried electrical conductors lay below the irrigation system.

3. The improvement of claim 2 wherein the pivot type irrigation system includes a rotating coupling by which water is conveyed from said pump into the sprinkler apparatus; and, wherein the generator is a three phase 480 volt AC and is directly connected to a first irrigation motor and said first irrigation motor is connected parallel respective to the primary of the high-voltage transformer.

4. A power distribution system that includes an irrigation system for watering a plurality of adjoining fields on which crops are grown, a water well in each of said fields, an electric motor driven pump that producing each water well; the method of irrigating the fields comprising the steps of:

- connecting a prime mover to an electrical generator;
- connecting a step-up transformer having a low voltage primary and a high voltage secondary winding to receive current from said electrical generator;
- connecting the primary of a plurality of step-down transforms in parallel; connecting the secondary of each of said step-down transformers to supply current to one said irrigation pump motor and energizing each said electric motor with contact means which are connected to a motor controller;
- connecting the secondary of said step-up transformer to the primary of said step-down transformers by using current carrying electrical conductors that are buried below the surface of the ground at a depth to be undisturbed by farming;
- conveying water from said pump to a pivot type irrigation system having a rotating coupling by which water is conveyed into the sprinkler system;
- wherein the generator is a three phase 480 volt AC and is directly connected to a first irrigation motor and said first irrigation motor is parallel respective to the primary of the first transformer.

* * * * *